June 14, 1932.  H. TAYLOR  1,863,131
TOOL HOLDER
Filed Nov. 26, 1930   2 Sheets-Sheet 1
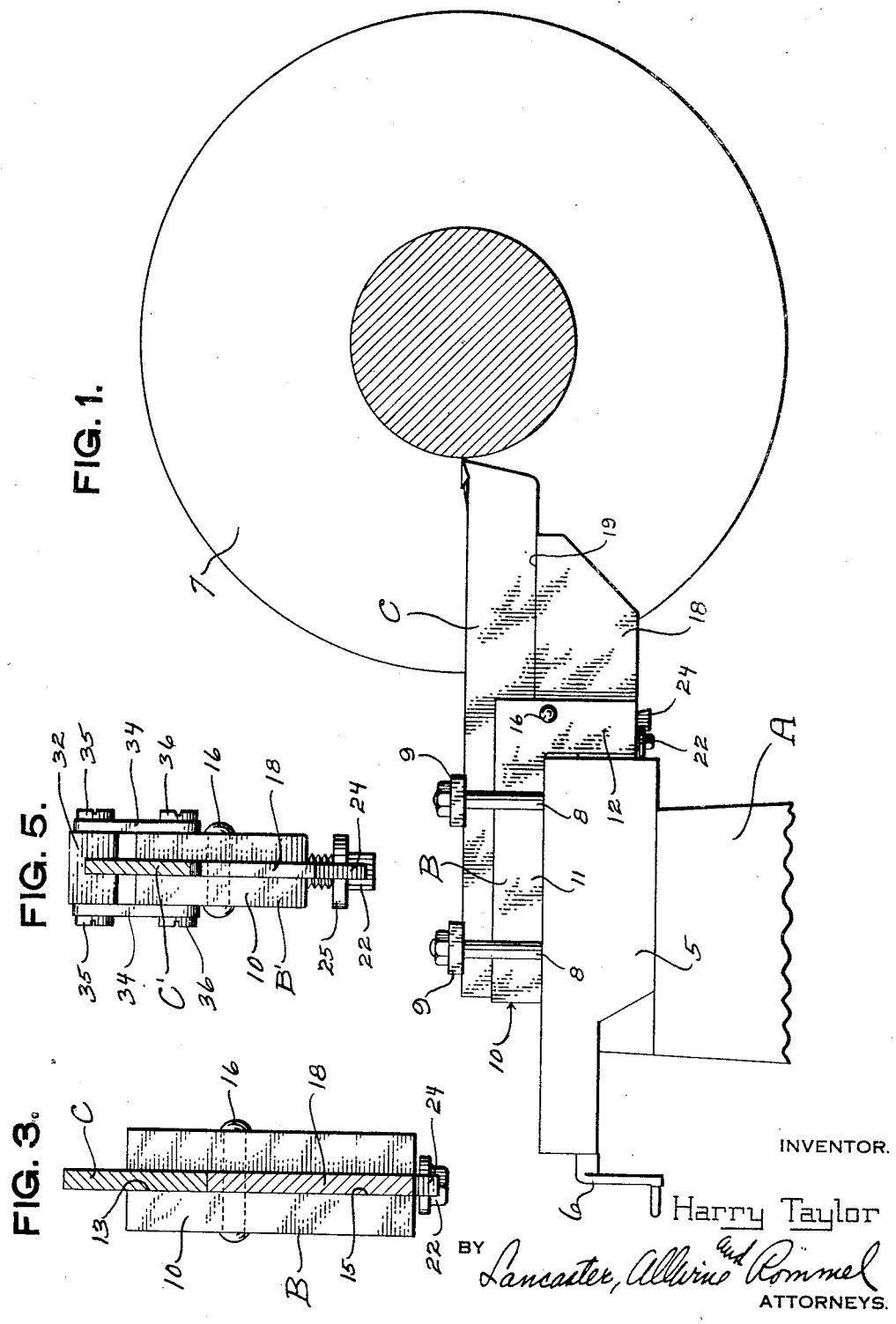
INVENTOR.
Harry Taylor
BY Lancaster, Allwine and Rommel
ATTORNEYS.

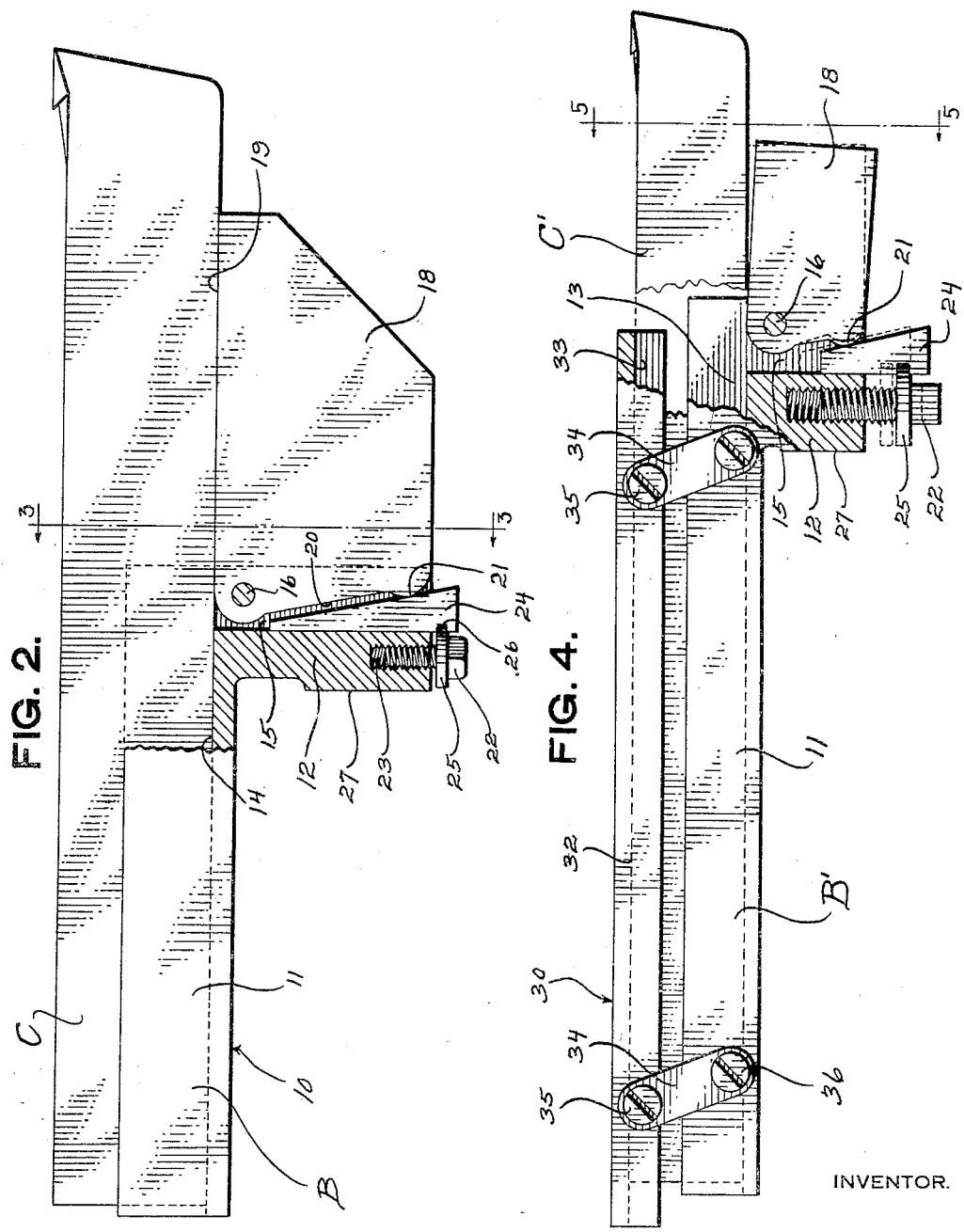

Patented June 14, 1932　　　　　　　　　　　　　1,863,131

UNITED STATES PATENT OFFICE

HARRY TAYLOR, OF BURLINGTON, NEW JERSEY

TOOL HOLDER

Application filed November 26, 1930. Serial No. 498,440.

The present invention relates to tool holders and more specifically to holders for cutting off tools of the blade type.

The primary object of the invention is to provide a tool holder for steadying and reducing the bending stress upon cutting off tools of the blade type.

A further object of the invention is to provide a tool holder whereby tool breakage will be eliminated by reducing the amount of overhang of the tool when cutting thru a thick mass of metal.

A further object resides in the novel manner in which the tool is given additional support closely adjacent its cutting end by a supporting element serving to carry the downward thrust, incident to cutting, directly to the mounting for the tool holder.

A further object resides in the adjustable supporting means whereby the supporting tongue is caused to bear against the lower edge of the cutting off tool to provide a firm and solid support for the tool adjacent its cutting end.

A still further object of the invention is to provide a device of this character which will permit use of relatively thin blade tools without yielding, and a holder which may be applied to a lathe compound or a boring mill head by the conventional mounting methods.

Other objects and advantages of the invention will be apparent during the course of the following detailed description, taken in connection with the accompanying drawings, forming a part of this specification and in which drawings:

Figure 1 is a side view of the improved tool holder shown mounted for use.

Figure 2 is an enlarged view part in side elevation and part in section of the holder and showing the blade tool in position in the holder.

Figure 3 is a section on a reduced scale on line 3—3 of Figure 2.

Figure 4 is a view in side elevation of a modified form of holder for use with relatively thin tools.

Figure 5 is a section on the line 5—5 of Figure 4.

Referring to the drawings in detail, and wherein similar reference characters designate corresponding parts thruout the several views, the letter A designates a lathe compound of a boring mill head provided with the tool rest or head block 5 provided with the cross feed handle 6 for movement of the block 5 toward and away from the work 7. The tool rest 5 is provided with the usual clamping bolts 8 which project upwardly from the rest and carry the straps 9 which extend across the tool holder for clamping the holder to the rest.

Referring to the form of invention shown in Figures 1, 2 and 3, the letter B designates the improved tool holder and C a cutting off tool of the blade type for mounting in the holder B.

The holder B comprises an L-shaped body portion 10 providing a rest portion 11 provided at its forward or inner end with a right angular downturned bearing extension 12. The rest or tool receiving portion 11 is slotted thruout its length as at 13 providing a blade receiving channel opening at the upper edge of the rest portion. The bottom of the slot or channel 13 is formed perfectly flat and provides a seat 14 for the lower straight edge of the tool C. The downturned bearing extension 12 is formed thruout its length with a forwardly opening channel 15 which communicates at its upper end with the slot or tool receiving channel 13 and the channel 15 is preferably of a width equal to the width of the channel 13.

Pivotally mounted in the upper portion of the forwardly opening channel 15 as by a suitable pivot pin 16 is an adjustable supporting tongue 18 formed of a suitable grade of steel and having a thickness equal to the thickness of the tool C. The supporting tongue 18 is provided with a straight upper edge 19 and preferably has its lower edge extending along a line even with the lower end of the bearing extension 12. The rear portion of the flat tongue 18 is arranged in the channel 15 and the rear edge 20 of the tongue is inclined downwardly and forwardly from the base of the channel 15. The lower end of the inclined edge 20 is provided with a rounded bearing projection 21.

Adjusting means is provided for insuring solid and firm bearing contact of the forward end of the tongue edge 19 with the lower edge of the tool C and embodies an adjusting screw 22 threaded upwardly into a tapped opening 23 provided in the lower end of the bearing extension 12. Slidable vertically in the channel 15 is a wedge 24 the straight edge of which has bearing contact with the base of the channel and the inclined edge of which forms a bearing surface for the bearing projection 21. The adjusting screw 22 is provided with a collar 25 for fitting in a notch 26 provided in the straight edge of the wedge 24. Adjustment of the screw 22 will raise or lower the wedge 24 and cause the supporting tongue 18 to pivot about the pin 16 and cause the forward end of the tongue to be raised or lowered so as to firmly contact with the lower edge of the tool C.

The rear or outer side of the bearing extension 12 is provided with a bearing face 27 preferably arranged at the lower end of the extension and disposed at a right angle to the lower surface of the rest portion 11.

In use, the holder is placed upon the rest 5 with the tool receiving portion 11 resting upon the upper surface of the rest 5 and the bearing face of the extension 12 engaging the inner end face of the rest 5. The tool C may then be placed in the channel 13 and the tool and holder clamped to the rest 5 by the clamping bolts 8. The upper edge of the tool C projects above the upper edge of the holder portion 11 so that the clamping bolts 8 serve to clamp the tool in the holder and the holder upon the rest 5.

With the tool so mounted in the holder it will be seen that the supporting tongue 18 firmly and solidly supports the tool at a point closely adjacent its cutting end and in this way prevents breaking of the tool and also holds the tool steady. The supporting tongue 18 acts to substantially increase the depth of the cutting off tool and by reason of the tongue being of a like thickness as that of the tool permits a deep cut to be made without interference from the supporting tongue. By observing Figure 1 it will be seen that the amount of overhang of the tool C is only from the inner end of the supporting tongue to the cutting end of the tool whereas with the usual amount of overhang of the tool, the overhang normally extends from the inner end of the rest 5 to the cutting end of the tool.

Thus it will be seen that downward thrust upon the end of the tool, incident to cutting, is transmitted thru the supporting tongue 18 and wedge 24 to the bearing face 27 having a solid bearing against the tool rest 5.

The form of holder B' shown in Figures 4 and 5 is designed for use with relatively thin cutting tools and is provided with a clamp 30 co-acting with the main body portion of the holder for steadying the cutting off tool C'. With the exception of the clamp 30, the tool holder B' is of like construction as that of the holder B and like reference characters have been applied to corresponding parts thereof. The holder B may be used for cutting tools having a thickness of 3/8" or more while the form of holder B' is primarily intended for use with relatively thin cutting tools of about 1/8" in thickness.

The clamp 30 comprises a clamping rail 32 of a length equal to the length of the rest portion 11 and provided at its under side with a longitudinal slot 33 for receiving the upper edge of the tool C'. Connecting the rail 32 in parallel relation above the rest portion 11 is a series of preferably four coupling links 34 pivotally connected at their upper ends to the rail by screws 35 and having their lower ends pivotally connected to the rest portion 11 by screws 36. This manner of movably coupling the rail 32 to the body portion 11 permits solid gripping of the tool C' between the channeled members 11 and 32. When the holder B' is applied to the tool rest 5, the clamping straps 9 engage the upper edge of the clamping rail 32 and force the rail toward the rest portion 11 so that the tool B' is firmly gripped in the holder.

In Figure 4 the adjustable supporting tongue 18 is shown in full lines in a lowered position and in dotted lines in a raised operative position against the under side of the tool C'.

Thus it will be seen that an improved type of tool holder for blade types of cutting off tools has been provided whereby tool breakage will be eliminated in making deep cuts, thru the provision of an adjustable tool supporting tongue providing a firm and solid support for the tool closely adjacent the cutting end of the tool. It will also be apparent that the improved tool holder may be mounted for use by the conventional clamping method and without requiring alteration of the rest upon which the holders are mounted.

Changes in detail may be made to the forms of invention herein shown and described, without departing from the spirit of the invention or the scope of the following claims.

I claim:

1. A tool holder comprising a body portion provided with a tool seat and a forwardly opening channel, and a supporting tongue carried in and extending forwardly from said channel and forming a support for the forward end of the cutting tool, and adjusting means for the tongue for adjusting the upper edge thereof with respect to said seat.

2. A tool holder comprising a body portion providing a rest portion and a depending bearing extension at the forward end of the rest portion provided with a head block bearing face, said rest portion being provided with a longitudinally formed tool seat, a supporting tongue pivotally carried by the upper end of the bearing extension and projecting forwardly therefrom, and adjusting means arranged in the bearing extension for adjusting the upper edge of the supporting tongue with respect to said tool seat.

3. A tool holder comprising a body portion including a horizontal rest portion provided with a tool seat and a depending bearing extension at the forward end of the rest portion and provided with a forwardly opening slot, a thin flat tongue pivotally mounted in the upper end of said slot and having a straight upper edge for aligning with said tool seat, and adjusting means for the tongue for adjusting the upper edge thereof with respect to said tool seat.

4. A tool holder comprising an L-shaped body portion providing a rest portion and a depending bearing portion at the forward end of the rest portion, said rest portion having a longitudinally formed channel providing a tool seat and said depending bearing extension having a forwardly opening guide channel aligning at the upper end with the rest portion channel, a thin flat tongue pivotally supported at its rear upper portion in the guide channel and extending forwardly from the rest portion, a wedge block movable in the guide channel and having an inclined edge engageable with the tongue, and an adjusting screw for longitudinally moving the wedge.

5. A tool holder comprising a body portion including a rest portion having an upwardly opening tool receiving channel and a depending extension at the forward end of the rest portion having a forwardly opening guide channel, a tool supporting tongue pivotally mounted in the upper portion of the guide channel and extending forwardly from the body portion in longitudinal alignment with the tool receiving channel, a wedge block guided in the guide channel and having an inclined edge engageable with the lower portion of the supporting tongue, and means for longitudinally adjusting the wedge block.

6. A tool holder comprising a body portion including a rest portion having an upwardly opening tool receiving channel and a depending bearing extension at the forward end of the rest portion provided with a forwardly opening guide channel, a thin flat supporting tongue pivotally mounted adjacent its upper rear edge in the upper portion of the guide channel, a bearing projection at the lower end of the rear edge of the supporting tongue, a wedge block longitudinally movable in the guide channel and having an inclined surface for engaging said bearing projection, and an adjusting screw for longitudinally moving the wedge block.

7. A tool holder comprising an L-shaped body portion providing a rest portion having an upwardly opening tool receiving channel and a bearing extension depending from the forward end of the rest portion and provided with a forwardly opening guide channel, a thin flat supporting tongue pivotally mounted adjacent its upper rear edge in the upper portion of the guide channel and extending forwardly of the holder body portion, said supporting tongue having a downwardly and forwardly inclined rear edge provided at its lower end with a rounded bearing projection, a wedge block longitudinally movable in the guide channel and having an inclined surface engageable with said rounded bearing projection, and an adjusting screw threaded into the lower end of the bearing extension for imparting longitudinal movement to the wedge block.

HARRY TAYLOR.